US009996932B2

(12) United States Patent
Wang et al.

(10) Patent No.: US 9,996,932 B2
(45) Date of Patent: Jun. 12, 2018

(54) METHOD AND SYSTEM FOR MULTI-LENS MODULE ALIGNMENT

(71) Applicant: Altek Semiconductor Corp., Hsinchu (TW)

(72) Inventors: Yu-Chih Wang, Hsinchu (TW); Shou-Te Wei, Hsinchu (TW); Yu-Wei Huang, Hsinchu (TW); Fu-Kui Yang, Hsinchu (TW); Chi-Ying Huang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 24 days.

(21) Appl. No.: 15/256,756

(22) Filed: Sep. 6, 2016

(65) Prior Publication Data
US 2017/0371123 A1    Dec. 28, 2017

(30) Foreign Application Priority Data
Jun. 24, 2016   (TW) ................. 105119829

(51) Int. Cl.
*G06K 9/00* (2006.01)
*G06T 7/00* (2017.01)
(52) U.S. Cl.
CPC ............ *G06T 7/0018* (2013.01); *G06T 7/001* (2013.01)
(58) Field of Classification Search
CPC combination set(s) only.
See application file for complete search history.

(56) References Cited

U.S. PATENT DOCUMENTS

| 9,113,083 B1 | 8/2015 | Chou et al. |
| 2015/0092089 A1* | 4/2015 | Vitsnudel ............... G06T 5/002 |
| | | 348/242 |
| 2015/0109418 A1* | 4/2015 | Lin .................... G01B 11/2522 |
| | | 348/47 |

FOREIGN PATENT DOCUMENTS

| CN | 202631858 | 12/2012 |
| CN | 104730802 | 6/2015 |
| TW | 201312080 | 3/2013 |
| TW | 201541961 | 11/2015 |

OTHER PUBLICATIONS

"Office Action of Taiwan Counterpart Application," dated Jun. 6, 2017, p. 1-p. 3.

* cited by examiner

*Primary Examiner* — Alex Liew
(74) *Attorney, Agent, or Firm* — JCIPRNET

(57) ABSTRACT

The disclosure provides a method and a system for multi-lens module alignment, adapted to perform alignment on a multi-lens module having at least a first lens and a second lens during its manufacturing stage, where the method includes the following steps. A calibration object is first captured by using the first lens and the second lens to accordingly generate intrinsic parameters and external parameters of the first lens and the second lens, where the external parameters of the first lens and the second lens are associated with a common reference coordinate system. A target object is next captured by using the first lens and the second lens, and captured images of the target object are processed by using the intrinsic parameters and the external parameters to generate rectified images. The first lens and the second lens are adjusted and aligned according to the rectified images.

20 Claims, 8 Drawing Sheets

METHOD AND SYSTEM FOR MULTI-LENS MODULE ALIGNMENT

CROSS-REFERENCE TO RELATED APPLICATION

This application claims the priority benefit of Taiwan application serial no. 105119829, filed on Jun. 24, 2016. The entirety of the above-mentioned patent application is hereby incorporated by reference herein and made a part of this specification.

TECHNICAL FIELD

The disclosure relates to a method and a system for multi-lens module alignment, in particular, to a method and a system for multi-lens module alignment during manufacture.

BACKGROUND

With development in technology, various smart image capturing devices, such as tablet computers, personal digital assistants and smart phones, have become indispensable tools for people nowadays. Camera lenses equipped in high-end smart mobile image capturing devices provide same or better specifications than those of traditional consumer cameras, and some even provide three-dimensional image capturing features or near-equivalent pixel qualities to those of digital single lens reflex cameras.

Ideally, two optical axes of a dual-lens module are supposed to be parallel to each other, and two lens centers are supposed to be perpendicular to a plane formed by the two optical axes. However, the optical axes and the lens centers are all invisible, and thus it is difficult for an inspector to ensure that the optical axes and the lens centers are precisely positioned in an assembly stage during manufacture.

SUMMARY OF THE DISCLOSURE

Accordingly, a method and a system for multi-lens module alignment are proposed in the disclosure to ensure precision disposition of optical axes and lens centers of a multi-lens module in its assembly stage during manufacture.

According to one of the exemplary embodiments, the method for multi-lens module alignment is adapted to perform alignment on a multi-lens module having at least a first lens and a second lens during manufacture. The method includes the following steps. A calibration object is first captured by using the first lens and the second lens to accordingly generate a first calibration parameter set corresponding to the first lens and a second calibration parameter set corresponding to the second lens, where the first calibration parameter set includes an intrinsic parameter and an external parameter of the first lens, and the second calibration set includes an intrinsic parameter and an external parameter of the second lens, and the external parameters of the first lens and the second lens are associated with a common reference coordinate system. A target object is next captured by using the first lens and the second lens, and captured images of the target object are processed by using the first calibration parameter set and the second calibration parameter set to generate rectified images. The first lens and the second lens are adjusted and aligned according to the rectified images.

According to one of the exemplary embodiments, the system for multi-lens module alignment includes a calibration object, a target object, an alignment platform, an image processing device, and a display. The alignment platform including a lens adjusting mechanism is configured to place the multi-lens module to be adjusted and aligned, where the multi-lens module at least includes a first lens and a second lens. The image processing device is configured to generate a first calibration parameter set corresponding to the first lens and a second calibration parameter set corresponding to the second lens according to images of the calibration object respectively captured by the first lens and the second lens and also configured to process images of the target object respectively captured by the first lens and the second lens by using the first calibration parameter set and the second calibration parameter set to generate rectified images, where the first calibration parameter set includes an intrinsic parameter and an external parameter of the first lens, and the second calibration set includes an intrinsic parameter and an external parameter of the second lens, and the external parameters of the first lens and the second lens are associated with a common reference coordinate system. The display is connected to the image processing device and configured to display the rectified images provided as references to adjust and align the first lens and the second lens.

In summary, in the proposed disclosure, prior to assembly and gluing of a multi-lens module, images for comparison and references are generated by using intrinsic parameters and external parameters of the lenses so as to determine whether optical axes and lens centers of the multi-lens module are precisely located based on image visualization, image recognition and comparison, and thus such images could be provided as an indication of whether to adjust and align the lenses in the assembly stage during manufacture.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
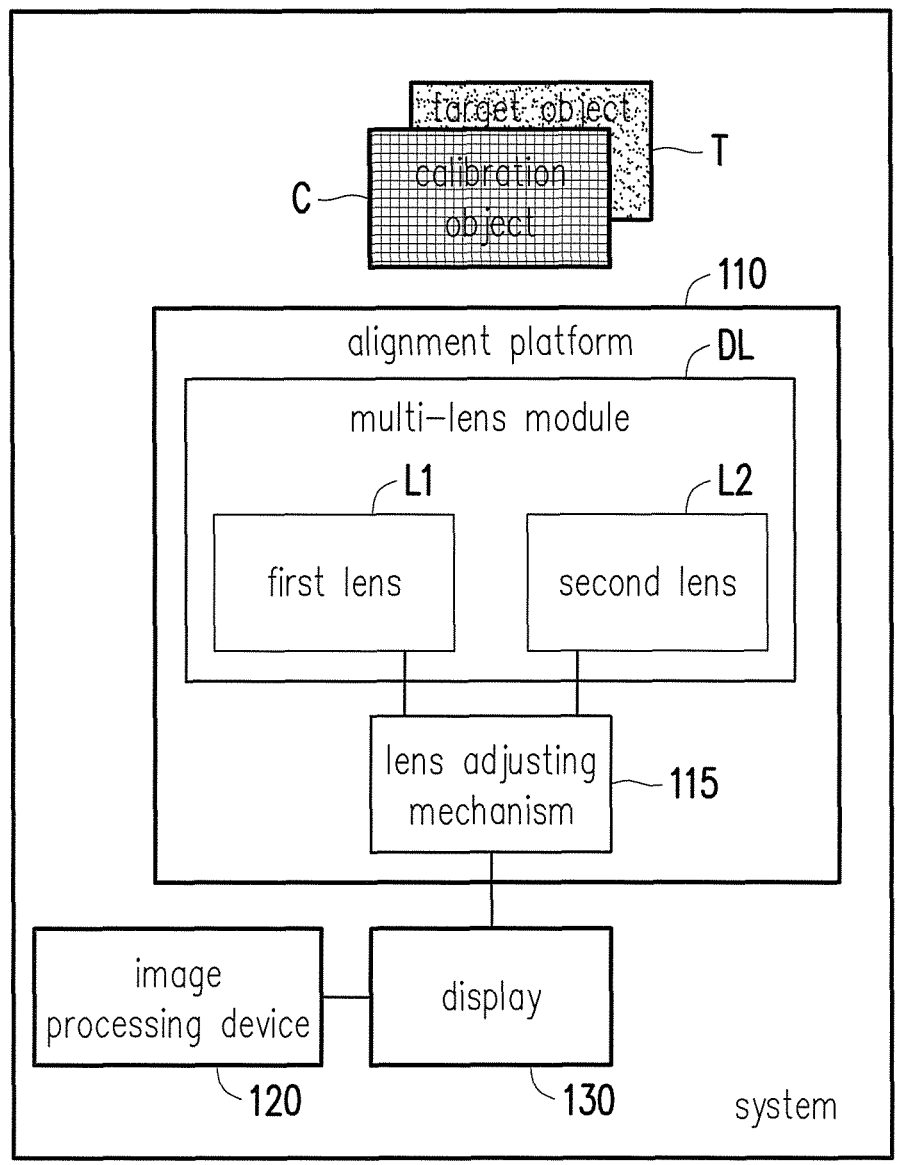
FIG. 1 illustrates a block diagram of a system for multi-lens module alignment in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system for multi-lens module alignment in accordance with one of the exemplary embodiments of the disclosure. All components of the system and their configurations are first introduced in FIG. 1. The functionalities of the components are disclosed in more detail in conjunction with FIG. 2.

Referring to FIG. 1, a system 100 includes an alignment platform 110, an image processing device 120, a display 130, a calibration object C, and a target object T. The system 100 is configured to perform alignment on a multi-lens module DL including at least a first lens L1 and a second lens L2 prior to its assembly and gluing.

The alignment platform 110 is configured to place the multi-lens module DL for alignment and includes a lens adjusting mechanism 115. The lens adjusting mechanism 115 could include a rotation mechanism and a translation mechanism configured to rotate and translate the first lens L1 and the second lens L2 by piezoelectric or mechanical control to adjust and align the multi-lens module DL.

The image processing device 120 could be an industrial computer, a personal computer, a laptop computer, a tabular computer, and so forth. The disclosure is not limited in this regard. The image processing device 120 would obtain images detected by sensing elements of the first lens L1 and the second lens L2 through wired or wireless transmission and perform image processing. The sensing elements could be charge coupled device (CCD) elements, complementary metal-oxide semiconductor (COMS) elements.

It should be understood by the person skilled in the art that the image processing device 120 would include a processor and a data storage device. The processor could be a central processing unit (CPI), a digital signal processor (DSP), a programmable controller, an application specific integrated circuit (ASIC), a programmable logic device (PLD), other similar devices or a combination of above-mentioned devices. The data storage device could be, one or a combination of a stationary or mobile random access memory (RAM), a read-only memory (ROM), a flash memory, a hard drive, other similar devices or a combination of above-mentioned devices.

The display 130 would obtain images detected by sensing elements of the first lens L1 and the second lens L2 as well as images processed by the image processing device 120 through wired or wireless transmission and display the obtained images for the user. In the present exemplary embodiment, the display 130 could be, for example, a liquid crystal display (LCD), a light-emitting diode (LED) display, a field emission display (FED) or other types of displays. Moreover, in another exemplary embodiment, the display 130 and the image processing device 120 could be integrated into an image processing device with a screen. The disclosure is not limited in this regard.

The calibration object C and the target object T would be respectively placed in front of the multi-lens module DL in different stages of the alignment process. In the present exemplary embodiment, the calibration object C could be a calibration board with a check pattern or other patterns easy to be recognized. The target object T could be an object which is the same as or different from the calibration object C. The disclosure is not limited in this regard.

Detailed steps of multi-lens module alignment during manufacture would be illustrated along with each component of the system 100 hereafter. As a pre-processing step of the following exemplary embodiments, the multi-lens module DL to be aligned has been placed on the adjustment platform 110.

Figure 2:
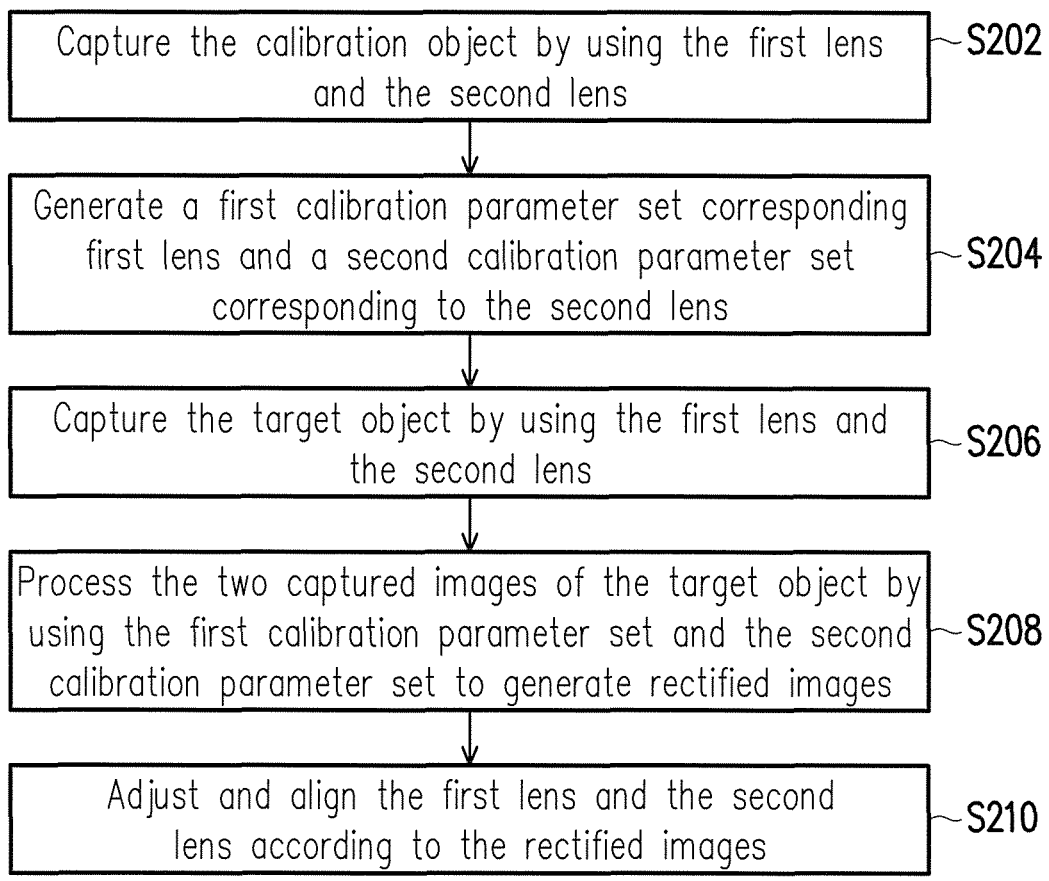
FIG. 2 illustrates a method for multi-lens module alignment in accordance with one of the exemplary embodiments of the disclosure.

FIG. 2 illustrates a method for multi-lens module alignment in accordance with one of the exemplary embodiments of the disclosure.

Referring to both FIG. 1 and FIG. 2, the calibration object C is captured by using the first lens L1 and the second lens L2 (Step S202) to respectively generate images of the calibration object C. Next, the image processing device 120 would perform calibration parameter calculation according to the two captured images of the calibration object C to generate a first calibration parameter set corresponding to the first lens L1 and a second calibration parameter set corresponding to the second lens L2 (Step S204). Herein, the first calibration parameter set includes an intrinsic parameter and an external parameter of the first lens L1. The second calibration parameter set includes an intrinsic parameter and an external parameter of the second lens L2, where the external parameter of the first lens and the external parameter of the second lens are associated with a common reference coordinate system.

In general, the intrinsic parameters would be used to describe a transformation between camera coordinates and image coordinates. That is, the camera coordinates may be projected onto a projective plane according to the pinhole imaging principle. The intrinsic parameters include focal length, image center, principal point, and distortion coefficients, which define internal geometric and optical characteristics of the first lens L1 and the second lens L2.

On the other hand, the external parameters would be used to describe a transformation between the world coordinates and the camera coordinates. That is, the positions and view directions of the first lens L1 and the second lens L2 in the 3D coordinates. The external parameters include rotation matrix and translation vector, which are related to disposition positions and view directions of the first lens L1 and the second lens L2. Since the external parameters describe the transformation between the camera coordinates of the first lens L1 and the second lens L2, the external parameters of the first lens L1 and the second lens L2 would correspond to a common reference coordinate system. In the present exemplary embodiment, such common reference coordinate system would be the world coordinate system. In another exemplary embodiment, it could also be another common reference coordinate system that corresponds to the external parameters of both the first lens L1 and the second lens L2.

Next, the target object T is captured by using the first lens L1 and the second lens L2 (Step S206) to respectively generate images of the target object T. The image processing device 120 would process the two captured images of the target object T by using the first calibration parameter set and the second calibration parameter set to generate rectified images (Step S208). Herein, the image processing device 120 would perform homography computation on the images of the target object T according to the first calibration parameter set and the second calibration parameter set to generate the rectified images. The purpose of the step is to estimate images of the target object T captured by the two lenses in an ideal condition (i.e. their two optical axes being parallel to each other and their lens centers being perpendicular to a plane formed by the two optical axes) according to the internal geometry and optical characteristics of the two lenses as well as the relative relationship between the two lenses. Such ideal images would be provided as references to adjust and align the lenses in the follow-up step.

Next, the display 130 would display the rectified images so as to provide the inspector of the multi-lens module DL to adjust and align the first lens L1 and the second lens through the lens adjusting mechanism 115 (Step S210). The adjustment and the alignment herein is to let the two optical axes be parallel to each other and their lens centers be perpendicular to a plane formed by the two optical axes through rotation and translation. More detailed explanation will be given later on.

Moreover, in another exemplary embodiment, the image processing device 120 would compute the required adjustment for the first lens L1 and the second lens L2 according to the rectified images based on image recognition and comparison, and then transmit a control command to the alignment platform 110 so as to control the lens adjusting mechanism 115 to perform alignment on the first lens L1 and the second lens L2.

Figure 3A:
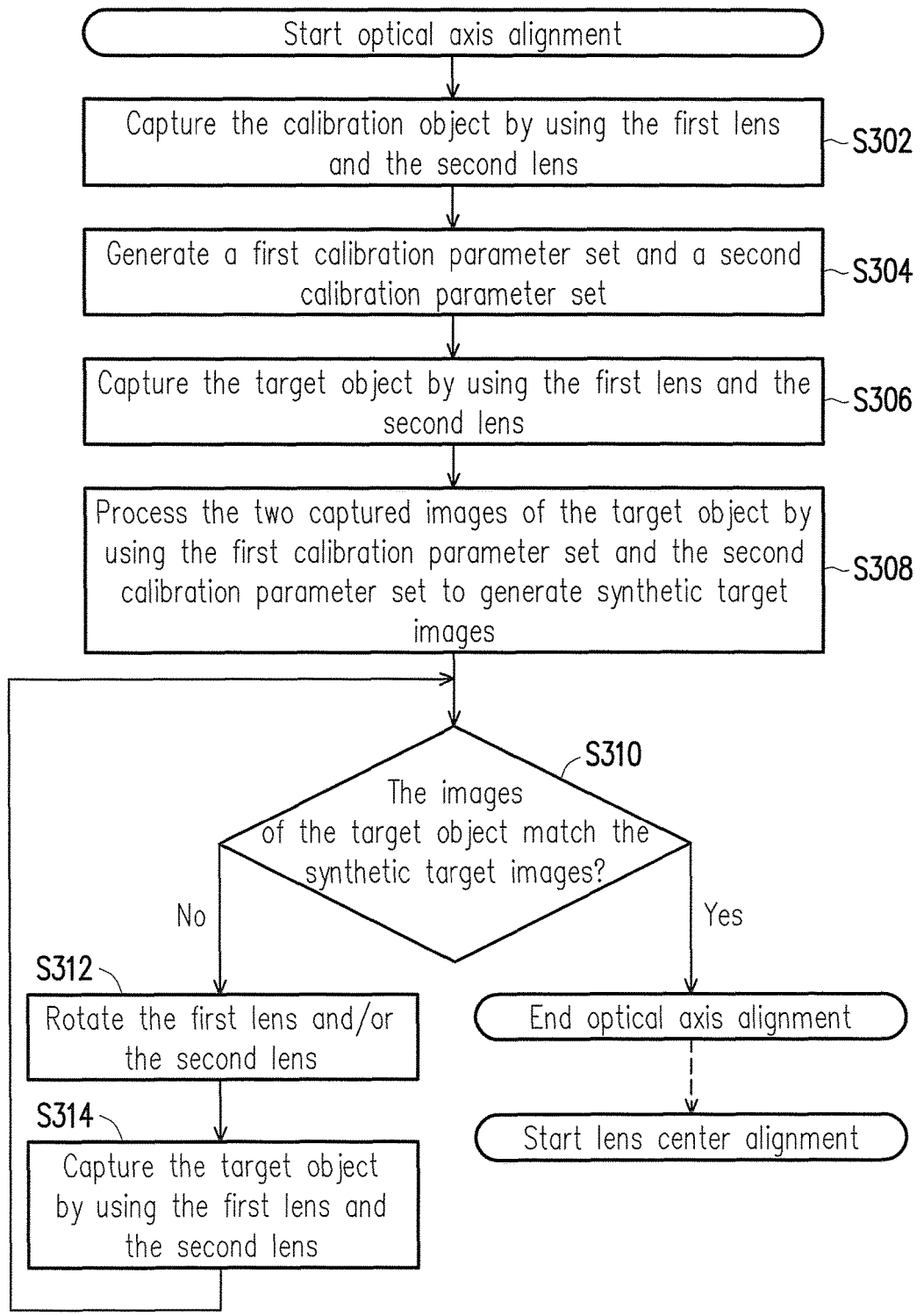
FIG. 3A illustrates a flowchart of a method for multi-lens module alignment on optical axes in accordance with one of the exemplary embodiments of the disclosure.

FIG. 3A illustrates a flowchart of a method for multi-lens module alignment on optical axes in accordance with one of the exemplary embodiments of the disclosure.

Referring to FIG. 3A, the calibration object C is captured by using the first lens L1 and the second lens L2 (Step S302) to respectively generate images of the calibration object C. Next, the image processing device 120 would perform calibration parameter calculation according to the two captured images of the calibration object C to generate a first calibration parameter set corresponding to the first lens L1 and a second calibration parameter sets corresponding to the second lens L2 (Step S304). Next, the target object T is captured by using the first lens L1 and the second lens L2 (Step S306) to respectively generate images of the target object T. The image processing device 120 would process the two captured images of the target object T by using the first calibration parameter set and the second calibration parameter set to generate synthetic target images (Step S308). The description on Steps S302-S308 could refer to Steps S202-S208 and would not be repeated herein for brevity. Moreover, the synthetic target images in Step S308 are the same as the rectified images in Step S208 and are used for alignment on the optical axes of the first lens L1 and the second lens L2.

In the present embodiment, the display 130 would concurrently display the images of the target object T and the synthetic target images so as to provide the inspector of the multi-lens module DL to determine whether the images of the target object T match the synthetic target images (Step S310). Moreover, Step S310 of determining whether the images of the target object T match the synthetic target images could also be performed by the image processing device 120 based on image recognition and comparison. The disclosure is not limited in this regard.

When the images of the target object T do not match the synthetic target images, the first lens L1 and/or the second lens L2 would be rotated by using the lens adjusting mechanism 115 to adjust the optical axis of the first lens L1 and/or the optical axis of the second lens L2 (Step S312). Next, the target object T would be captured by the adjusted first lens L1 and the adjusted second lens L2 (Step S314), and the flow returns to Step S310 until the images of the target object T captured by the adjusted first lens L1 and the adjusted second lens L2 respectively match their synthetic target images. On the other hand, when the images of the target object T match the synthetic target images, the flow of multi-lens module DL alignment on optical axes would be completed. If the lens centers of the first lens L1 and the second lens L2 have not yet been adjusted prior to the flow of optical axis alignment as illustrated in FIG. 3A, the flow of lens center alignment could be optionally performed. It should be noted that, the optical axis of the first lens L1 and the optical axis of the second lens L2 have their individual synthetic target images, and thus could be independently adjusted. The disclosure is not limited in this regard.

Figure 3B:
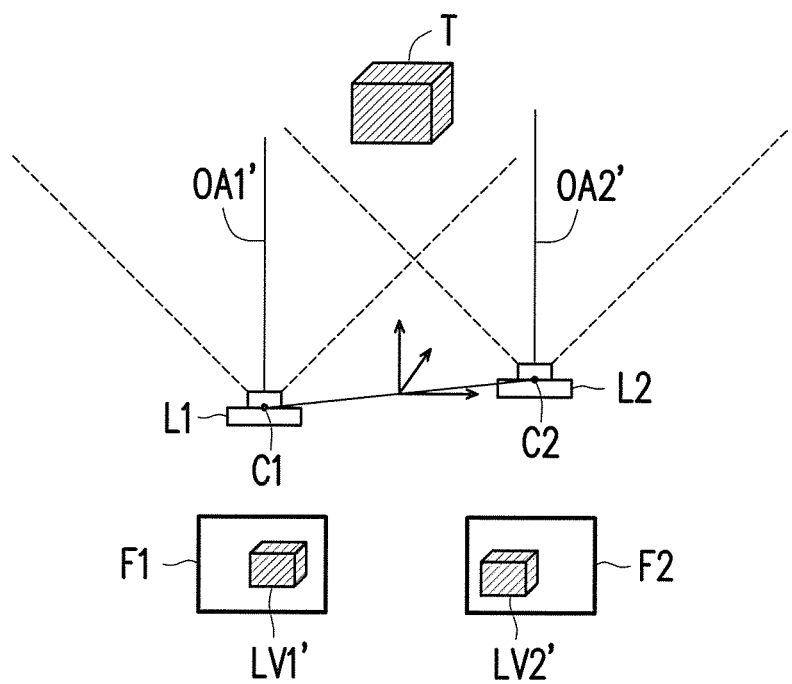
FIG. 3B illustrates schematic diagrams of optical axes of a multi-lens module before and after alignment.
Figure 3C:
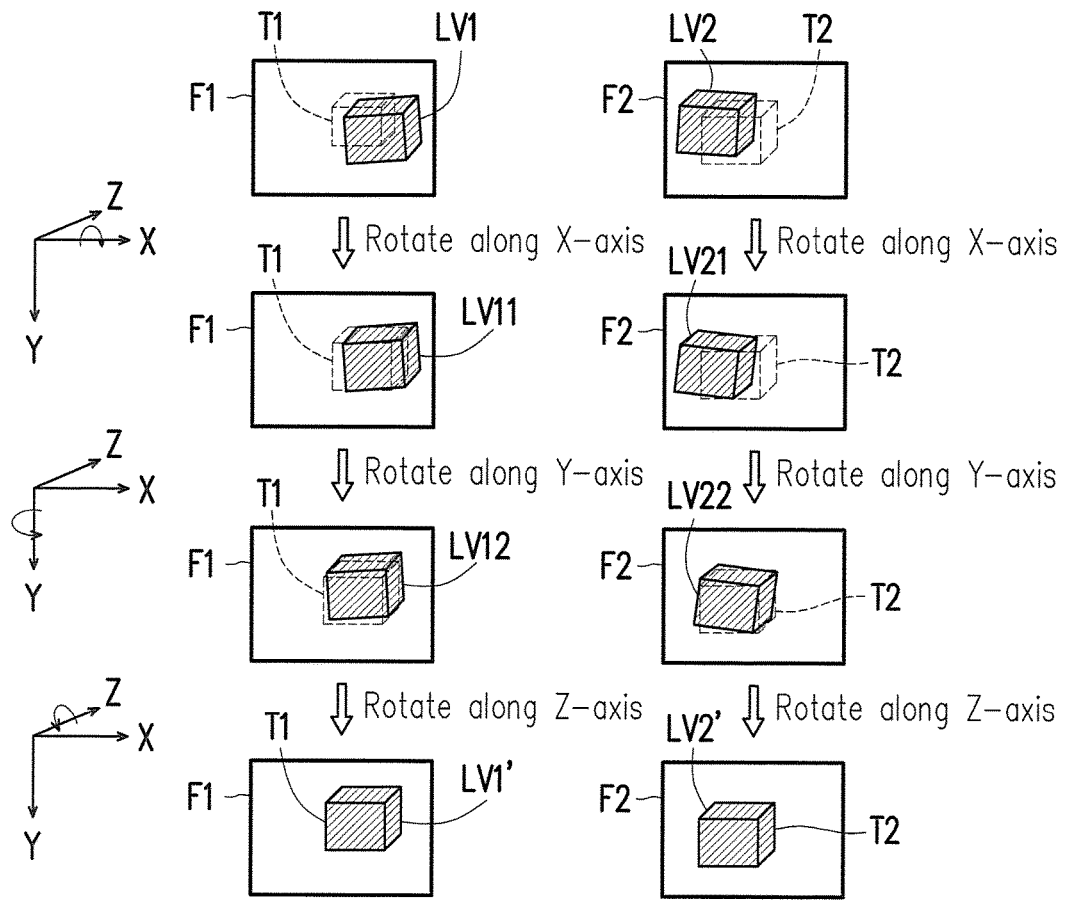
FIG. 3C illustrates a schematic flow diagram for multi-lens module alignment on optical axes.

To be specific, FIG. 3B illustrates schematic diagrams of optical axes of a multi-lens module before and after alignment. FIG. 3C illustrates a schematic flow diagram for multi-lens module alignment on optical axes.

Referring first to FIG. 3B, assume that the display 130 respectively display images captured by the first lens L1 and the second lens L2 on two side-by-side windows F1 and F2. Prior to the optical axis alignment being performed on the multi-lens module DL, after the target object T is respectively captured by the first lens L1 and the second lens L2, a first target object image LV1 and a second target object image LV2 of the target object T would be generated. Herein, an optical axis OA1 of the first lens L1 is not parallel to an optical axis OA2 of the second lens L2 so that the first target object image LV1 and the second target object image LV2 are different due to the two non-parallel optical axes.

Next, referring to FIG. 3C, the display 130 would concurrently display a first synthetic target image T1 and the first target object image LV1 on the side window F1 as well as a second synthetic target image T2 and the second target object image LV2 on the side window F2 so as to provide an intuitive lens alignment approach for the inspector. In the present embodiment, the first lens L1 would be adjusted by the lens adjusting mechanism 115 in a horizontal direction (X axis), a vertical direction (Y axis), and a back-and-forth direction (Z axis) sequentially so that the first lens L1 would capture a first target object image LV11 after it rotates along the X-axis, a first target object image LV 12 after it rotates along the Y-axis, and a first target object image LV1' which overlaps the first synthetic target image T1 after it rotates along the Z-axis. Similarly, the second lens L2 would be adjusted by the lens adjusting mechanism 115 in a horizontal direction, a vertical direction, and a backward and forward direction sequentially so that the images captured by the adjusted second lens L2 would respectively be a second target object image LV21, a second target object image LV 22, and a second target object image LV2' which overlaps the second synthetic target image T2.

Revisiting FIG. 3B, after the multi-lens module DL completes the optical axis alignment, there no longer exists any difference between the first target object image LV1' and the second target object image LV2' captured by the first lens L1 and the second lens L2 due to non-paralleled optical axes. That is, an adjusted optical axis OA1' of the first lens L1 is parallel to an adjusted optical axis OA2' of the second lens L2.

Figure 4A:
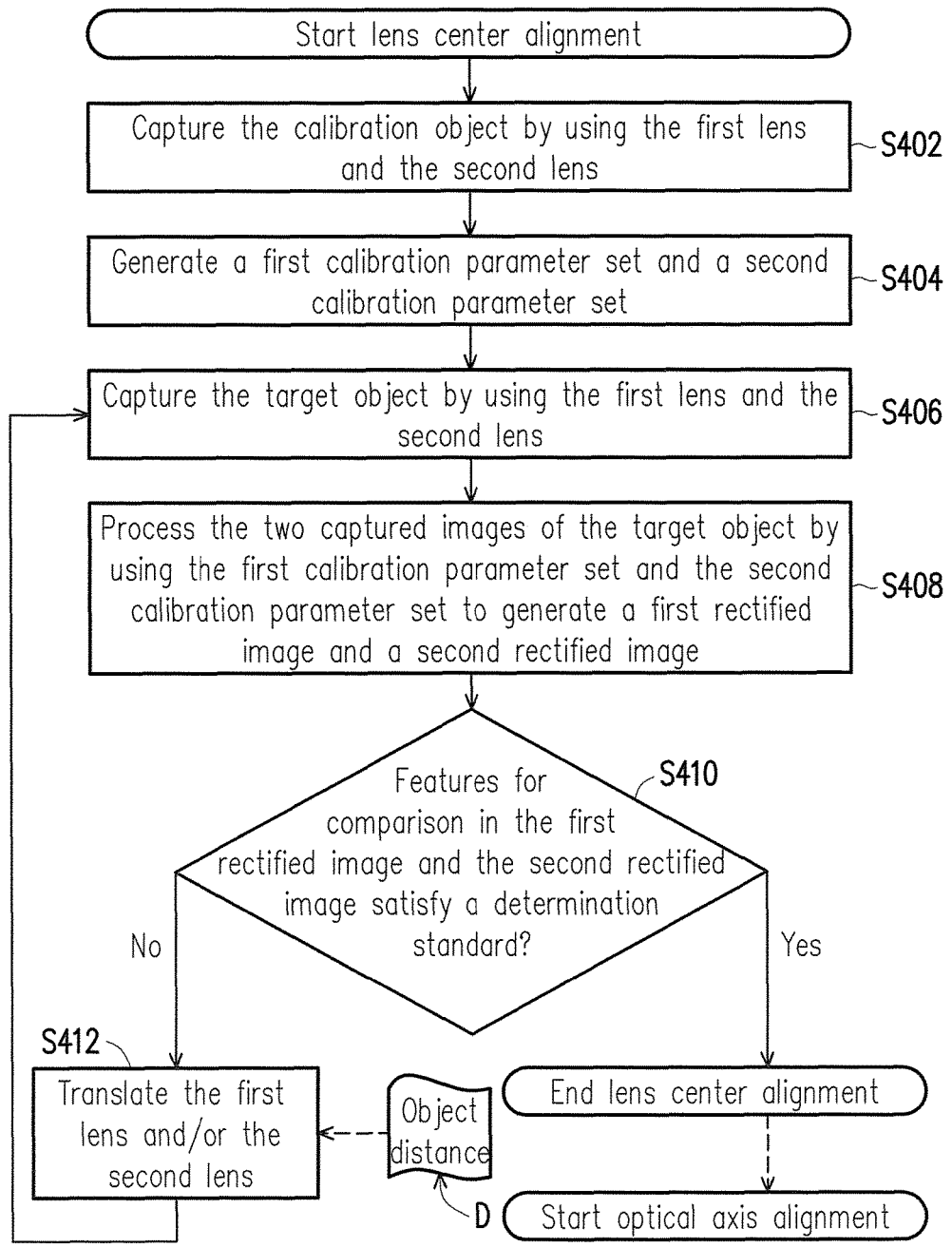
FIG. 4A illustrates a flowchart of a method for multi-lens module alignment on lens centers in accordance with one of the exemplary embodiments of the disclosure.

FIG. 4A illustrates a flowchart of a method for multi-lens module alignment on lens centers in accordance with one of the exemplary embodiments of the disclosure.

Referring to FIG. 4A, the calibration object C is captured by using the first lens L1 and the second lens L2 (Step S302) to respectively generate images of the calibration object C. Next, the image processing device 120 would perform calibration parameter calculation according to the two captured images of the calibration object C to generate a first calibration parameter set corresponding to L1 and a second calibration parameter sets corresponding to L2 (Step S404). Next, the target object T is captured by using the first lens L1 and the second lens L2 (Step S406) to respectively generate images of the target object T. The image processing device 120 would process the two captured images of the target object T by using the first calibration parameter set and the second calibration parameter set to generate a first rectified image and a second rectified image (Step S408). The description on Steps S402-S408 could refer to Steps S202-S208 and would not be repeated herein for brevity. Herein, the first rectified image and the second rectified image are provided as references to adjust and align the lens centers of the first lens L1 and the second lens L2.

In the present embodiment, the display 130 would concurrently display the first rectified image and the second rectified image so as to provide the inspector of the multi-lens module DL to determine whether features for comparison in the first rectified image and the second rectified image satisfy a determination standard (Step S410). Similarly, Step S410 of determining whether the features for comparison in the first rectified image and the second rectified image satisfy a determination standard could also be performed by the image processing device 120 based on image recognition and comparison. The disclosure is not limited in this regard.

When the features for comparison in the first rectified image and the second rectified image do not satisfy the determination standard, the first lens L1 and/or the second lens L2 would be translated by the lens adjusting mechanism 115 so as to adjust the lens center of the first lens L1 and the lens center of the second lens L2 (Step S412). The features for comparison could be sizes, horizontal lines, parallax of the two rectified images, and whether the lens centers of the first lens L1 and the second lens L2 are shifted back and forth, left and right, and up and down. Next, the flow returns to Step S406 until the features for comparison in the first rectified image and the second rectified image generated through image capturing by the adjusted first lens L1 and the second lens L2 and rectification satisfy the determination standard.

On the other hand, when the features for comparison in the first rectified image and the second rectified image satisfy the determination standard, the flow of multi-lens module DL alignment on lens centers would be completed. If the optical axes of the first lens L1 and the second lens L2 have not yet been adjusted prior to the flow of lens center alignment as illustrated in FIG. 4A, the flow of optical axis alignment in FIG. 3A could be optionally performed.

Figure 4B:
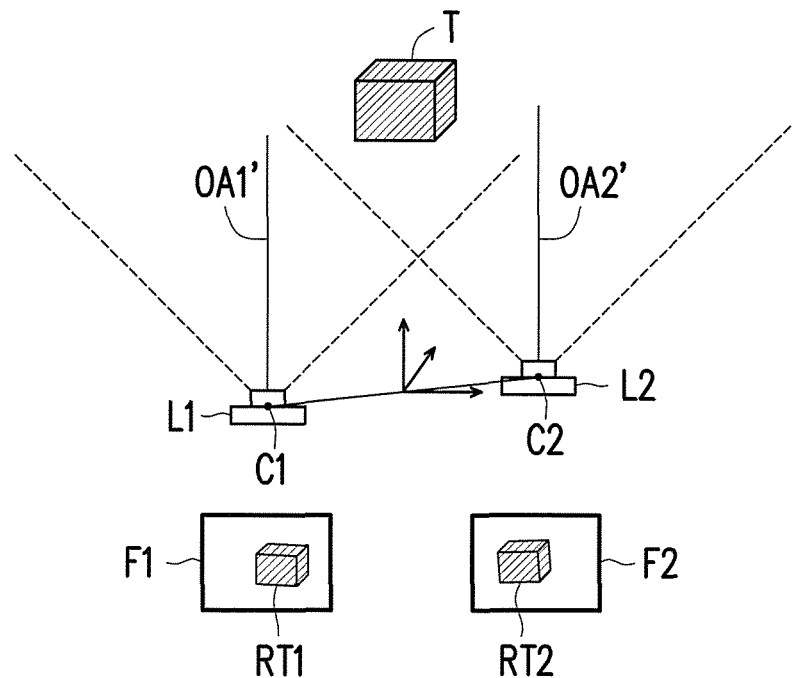
FIG. 4B illustrates schematic diagrams of lens centers of a multi-lens module before and after alignment.
Figure 4B:
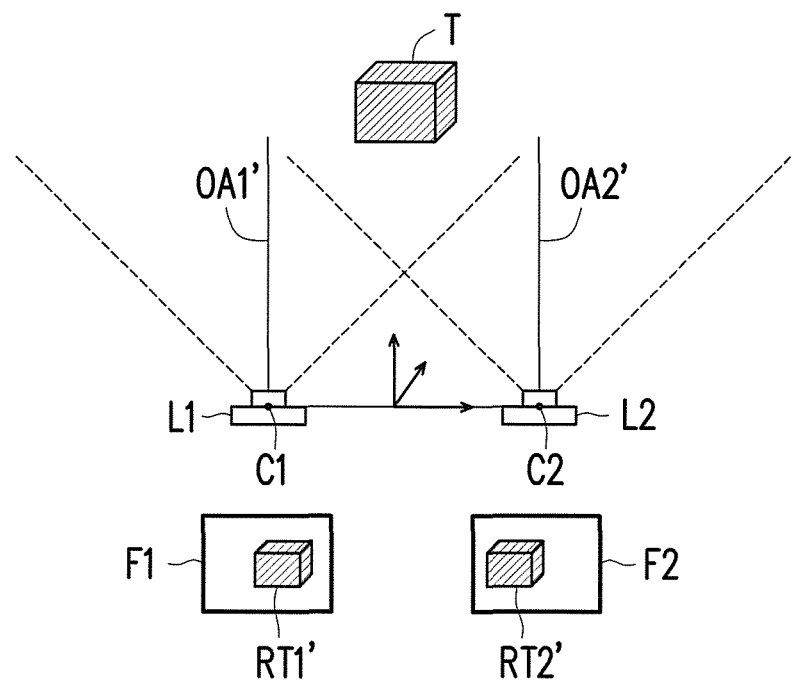
Figure 4C:
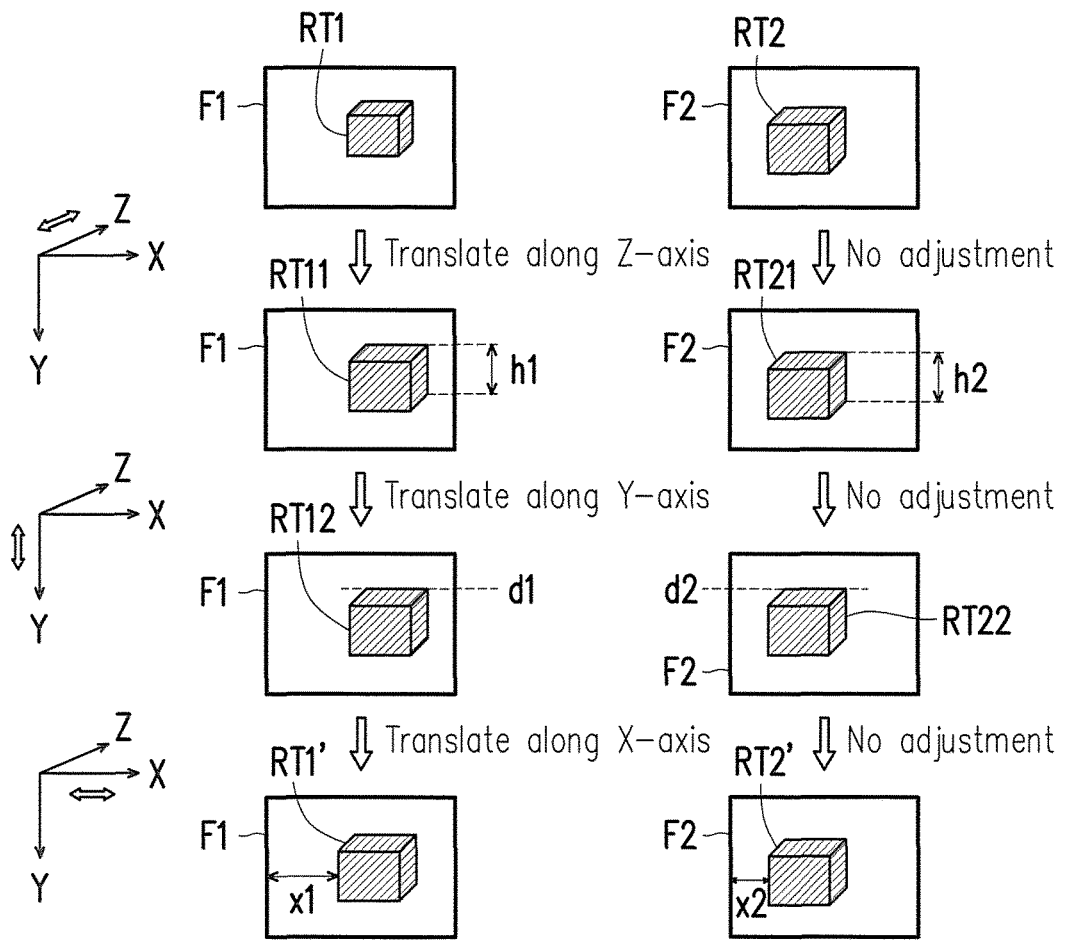
FIG. 4C illustrates a schematic flow diagram for multi-lens module alignment on lens centers.

To be specific, FIG. 4B illustrates schematic diagrams of lens centers of a multi-lens module before and after alignment. FIG. 4C illustrates a schematic flow diagram for multi-lens module alignment on lens centers. In the present embodiment, it is assumed that the optical axis alignment has already been performed on the first lens L1 and the second lens L2.

Referring first to FIG. 4B, assume that the display 130 respectively display images captured by the first lens L1 and the second lens L2 on two side-by-side windows F1 and F2. Prior to the lens center alignment being performed on the multi-lens module DL, after the target object T is respectively captured by the first lens L1 and the second lens L2 and the captured images are calibrated, a first rectified image RT1 and a second rectified image RT2 of the target object T would be generated. Herein, a joint line of a lens center C1 of the first lens L1 and a lens center C2 of the second lens L2 is not parallel to a horizontal axis of the world coordinate system so that there exist horizontal differences between the first rectified image RT1 and the second rectified image RT2.

Next, referring to FIG. 4C, the display 130 would concurrently display a first rectified image RT1 of the first lens L1 on the side window F1 and the second rectified image RT2 of the second lens L2 on the side window F1 so as to provide an intuitive lens alignment approach for the inspector. In the present embodiment, the second lens L2 is assumed to be a reference, and only the first lens L1 would be adjusted. However, the disclosure is not limited in this regard. First, whether a height h1 of the target object T in the first rectified image RT1 matches a height h2 of the target object T in the second rectified image RT2 so as to accordingly determine whether the sizes of the target object T in the two rectified images are the same. If their sizes are not the same, the first lens L1 and the second lens L2 would be translated by the lens adjusting mechanism 115 in a back-and-forth direction (Z axis) until the heights h1 and h2 match.

Next, whether a horizontal line d1 of the first rectified image RT1 is aligned to a horizontal line d2 of the second rectified image RT2, or whether same feature points respectively in the first rectified image RT1 and the second rectified image RT2 lie on a same horizontal line would be determined so as to determine whether the horizontal lines in the two rectified images are aligned. If they are not aligned, the first lens L1 and the second lens L2 would be translated by the lens adjusting mechanism 115 in a vertical direction until the horizontal lines d1 and d2 are aligned.

Next, whether an actual parallax (x1-x2) between the first rectified image RT1 and the second rectified image RT2 satisfies an expected parallax could be determined according to an object distance D of the target object T based on Eq.(1):

$$d = \frac{B \times F}{D} \qquad \text{Eq. (1)}$$

where d denotes the expected parallax, F denotes a focus length of the main lens, B denotes the distance between two lens centers (i.e. the length of a baseline), and D denotes the distance between an object and the lens. When the actual parallax does not satisfy the expected parallax, the first lens L1 and the second lens L2 would be adjusted by the lens adjusting mechanism 115 in a horizontal direction. That is, the length of the baseline would be adjusted, and the actual parallax (x1-x2) between a first rectified image RT1' and a second rectified image RT2' that satisfies the expected parallax would be thus generated.

Revisiting FIG. 4B, after the multi-lens module DL completes the lens center alignment, after the target object T is captured by the adjusted first lens L1 and the adjusted second lens L2 and the captured images are rectified, the first rectified image RT1' and the second rectified image RT2' which satisfy the determination standard would be generated. Herein, a joint line of the lens center C1 of the first lens L1 and the lens center C2 of the second lens L2 would be parallel to the horizontal line of the world coordinate system.

In summary, in the method and system for multi-lens module alignment proposed in the disclosure, prior to assembly and gluing of a multi-lens module, images for comparison and references are generated by using intrinsic parameters and external parameters of the lenses so as to determine whether optical axes and lens centers of the multi-lens module are precisely located based on image visualization, image recognition and comparison, and thereby determine whether to adjust the lenses through rotation or translation. Hence, the disclosure ensures precision disposition of optical axes and lens centers of a multi-lens module provides high-quality assembly and testing during manufacture.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for multi-lens module alignment, adapted to perform alignment on a multi-lens module comprising a first lens and a second lens during manufacture, wherein the method comprises the following steps:
    capturing a calibration object by using the first lens and the second lens to accordingly generate a first calibration parameter set corresponding to the first lens and a second calibration parameter set corresponding to the second lens, wherein the first calibration parameter set comprises an intrinsic parameter and an external parameter of the first lens, wherein the second calibration parameter set comprises an intrinsic parameter and an external parameter of the second lens, and wherein the external parameter of the first lens and the external parameter of the second lens are associated with a common reference coordinate system;
    capturing a target object by using the first lens and the second lens, and processing images of the target object respectively captured by the first lens and the second lens by using the first calibration parameter set and the second calibration parameter set to generate rectified images; and
    adjusting and aligning the first lens and the second lens according to the rectified images.

2. The method according to claim 1, wherein the step of adjusting and aligning the first lens and the second lens according to the rectified images comprises:
    setting each of the rectified images as a synthetic target image; and
    continuously adjusting and aligning the first lens and the second lens and capturing the target object by using the first lens and the second lens until images respectively captured by the first lens and the second lens match the synthetic target images.

3. The method according to claim 2, wherein the synthetic target images comprise a first synthetic target image and a second synthetic target image, and wherein the step of continuously adjusting and aligning the first lens and the second lens and capturing the target object by using the first lens and the second lens until images respectively captured by the first lens and the second lens match the target images comprises:
    for the first lens:
        capturing the target object by using the first lens to generate a first target object image;
        determining whether the first target object image matches the first synthetic target image; and
        if not, adjusting the first lens and capturing the target object by using the adjusted first lens to re-generate the first target object image; and
    for the second lens:
        capturing the target object by using the second lens to generate a second target image;
        determining whether the second target object image matches the second synthetic target image; and
        if not, adjusting the second lens and capturing the target object by using the adjusted second lens to re-generate the second target object image.

4. The method according to claim 3, wherein the steps of adjusting the first lens and adjusting the second lens respectively comprise:
    rotating the first lens with respect to a lens center thereof so as to adjust an optical axis of the first lens; and
    rotating the second lens with respect to a lens center thereof so as to adjust an optical axis of the second lens.

5. The method according to claim 4, wherein after the steps of adjusting the optical axis of the first lens and adjusting the optical axis of the second lens, the method further comprises:
    aligning the lens center of the first lens and the lens center of the second lens.

6. The method according to claim 1, wherein the rectified images comprise a first rectified image and a second rectified image, and wherein the step of adjusting and aligning the first lens and the second lens according to the rectified images comprises:
    determining whether features for comparison in the first rectified image and the second rectified image satisfy a determination standard; and
    if no, aligning the first lens and the second lens to re-capture the target object, and processing images of the target object respectively captured by the first lens and the second lens by using the first calibration parameter set and the second calibration parameter set to re-generate the first rectified image and the second rectified image.

7. The method according to claim 6, wherein the step of aligning the first lens and the second lens comprises:
    translating at least one of the first lens and the second lens so as to align a lens center of the first lens and a lens center of the second lens.

8. The method according to claim 7, wherein the determination standard is that a size of the first rectified image is the same as that of the second rectified image, and wherein the step of translating the first lens and the second lens comprises:
moving at least one of the first lens and the second lens in a back-and-forth direction.

9. The method according to claim 7, wherein the determination standard is that a horizontal line of the first rectified image is aligned with that of the second rectified image, and wherein the step of translating the first lens and the second lens comprises:
moving at least one of the first lens and the second lens in a vertical direction.

10. The method according to claim 7, wherein the determination standard is that an actual parallax between the first rectified image and the second rectified image matches an expected parallax, and wherein the step of translating the first lens and the second lens comprises:
moving at least one of the first lens and the second lens in a horizontal direction according to an object distance of the target object.

11. The method according to claim 7, wherein after the step of aligning the lens center of the first lens and the lens center of the second lens, the method further comprises:
adjusting an optical axis of the first lens and an optical axis of the second lens.

12. A system for multi-lens module alignment, adapted to perform alignment on a multi-lens module comprising a first lens and a second lens during manufacture, wherein the system comprises:
a calibration object;
a target object;
an alignment platform, configured to place the multi-lens module to be adjusted and aligned and comprising a lens adjusting mechanism configured to adjust the first lens and the second lens;
an image processing device, connected to the first lens and the second lens, configured to process images of the calibration object respectively captured by the first lens and the second lens to accordingly generate a first calibration parameter set corresponding to the first lens and a second calibration parameter set corresponding to the second lens, and configured to process images of the target object respectively captured by the first lens and the second lens by using the first calibration parameter set and the second calibration parameter set to generate rectified images, wherein the first calibration parameter set comprises an intrinsic parameter and an external parameter of the first lens, wherein the second calibration parameter set comprises an intrinsic parameter and an external parameter of the second lens, and wherein the external parameter of the first lens and the external parameter of the second lens are associated with a common reference coordinate system; and
a display, connected to the image processing device, and configured to display the rectified images as references to adjust and align the first lens and the second lens.

13. The system according to claim 12, wherein the image processing device sets each of the rectified images as a synthetic target image, wherein the display displays the synthetic target images, and wherein the lens adjusting mechanism continuously adjusts and aligns the first lens and the second lens and controls the adjusted first lens and the adjusted second lens to capture the target object until images respectively captured by the first lens and the second lens match the synthetic target images.

14. The system according to claim 13, wherein for the first lens, the display displays a first target object image of the target object captured by the first lens, and when the first target object image does not match the first synthetic target image, the lens adjusting mechanism adjusts the first lens, and the display re-displays the first target object image captured by the adjusted first lens, and wherein for the second lens, the display displays a second target object image of the target object captured by the second lens, and when the second target object image does not match the second synthetic target image, the lens adjusting mechanism adjusts the second lens, and the display re-displays the second target object image captured by the adjusted second lens.

15. The system according to claim 14, wherein the lens adjusting mechanism rotates the first lens with respect to a lens center thereof so as to adjust an optical axis of the first lens, and wherein the lens adjusting mechanism rotates the second lens with respect to a lens center thereof so as to adjust an optical axis of the second lens.

16. The system according to claim 12, wherein when features for comparison in the first rectified image and the second rectified image do not match, the lens adjusting mechanism adjusts and aligns the first lens and the second lens, the image capturing device captures the target object by using the first lens and the second lens after adjustment and alignment, and the image processing device processes images of the target object respectively captured by the first lens and the second lens by using the first calibration parameter set and the second calibration parameter set to re-generate the first rectified image and the second rectified image.

17. The system according to claim 16, wherein the lens adjusting mechanism translates at least one of the first lens and the second lens so as to align a lens center of the first lens and a lens center of the second lens.

18. The system according to claim 17, wherein when a size of the first rectified image is not the same as that of the second rectified image, the lens adjusting mechanism moves at least one of the first lens and the second lens in a back-and-forth direction.

19. The system according to claim 17, wherein when a horizontal line of the first rectified image is not aligned with that of the second rectified image, the lens adjust mechanism moves at least one of the first lens and the second lens in a vertical direction.

20. The system according to claim 17, wherein when an actual parallax between the first rectified image and the second rectified image does not match an expected parallax, the lens adjusting mechanism moves at least one of the first lens and the second lens in a horizontal direction according to an object distance of the target object.

* * * * *